(12) United States Patent
Kurre et al.

(10) Patent No.: US 9,673,460 B2
(45) Date of Patent: Jun. 6, 2017

(54) FUEL CELL SYSTEM, USE OF A FUEL CELL SYSTEM AND AIRCRAFT WITH A FUEL CELL SYSTEM

(71) Applicant: Airbus Operations GmbH, Hamburg (DE)

(72) Inventors: Jens-Dietrich Kurre, Buchholz (DE); Claus Hoffjann, Hamburg (DE)

(73) Assignee: Airbus Operations GmbH (DE)

( * ) Notice: Subject to any disclaimer, the term of this patent is extended or adjusted under 35 U.S.C. 154(b) by 0 days.

(21) Appl. No.: 13/917,837

(22) Filed: Jun. 14, 2013

(65) Prior Publication Data

US 2013/0288160 A1    Oct. 31, 2013

Related U.S. Application Data

(63) Continuation of application No. PCT/EP2011/069953, filed on Nov. 11, 2011.
(Continued)

(30) Foreign Application Priority Data

Dec. 16, 2010   (DE) .......................... 10 2010 054 756

(51) Int. Cl.
*H01M 8/04082* (2016.01)
*B64D 41/00* (2006.01)
(Continued)

(52) U.S. Cl.
CPC ........ *H01M 8/04201* (2013.01); *B64D 41/00* (2013.01); *H01M 8/04089* (2013.01); *H01M 8/2475* (2013.01); *B64D 2041/005* (2013.01); *H01M 8/04231* (2013.01); *H01M 8/0662* (2013.01); *Y02T 50/44* (2013.01); *Y02T 90/36* (2013.01)

(58) Field of Classification Search
CPC ....................................................... H01M 8/04
USPC ................................................. 429/512–513
See application file for complete search history.

(56) References Cited

U.S. PATENT DOCUMENTS 5,462,817 A   10/1995 Hsu
6,124,053 A   9/2000 Bernard et al.
(Continued)

FOREIGN PATENT DOCUMENTS

DE   102007011534    *   9/2007 ............. F23N 5/003
DE   102007011534 A1    9/2007
(Continued)

OTHER PUBLICATIONS

English Translation of JP 2001-338660.*
English Translation of DE102007011534.*

*Primary Examiner* — Patrick Ryan
*Assistant Examiner* — Kiran Akhtar
(74) *Attorney, Agent, or Firm* — Lerner, David, Littenberg, Krumholz & Mentlik, LLP

(57) ABSTRACT

A fuel cell system includes a fuel cell having a housing that encases the fuel cell, a supply line for a fuel cell fuel, and an exhaust gas line for fuel-cell exhaust gas. In this arrangement the supply line extends in the exhaust gas line, and the exhaust gas line encases the supply line while forming a space. Any leakage in the supply line thus results in the fuel being flushed out by means of the exhaust gases flowing in the exhaust gas line so that higher system reliability and a reduction in costs can be achieved.

10 Claims, 3 Drawing Sheets

Related U.S. Application Data

(60) Provisional application No. 61/423,703, filed on Dec. 16, 2010.

(51) Int. Cl.
*H01M 8/04089* (2016.01)
*H01M 8/2475* (2016.01)
*H01M 8/04223* (2016.01)
*H01M 8/0662* (2016.01)

(56) References Cited

U.S. PATENT DOCUMENTS

| | | | |
|---|---|---|---|
| 2003/0134174 A1* | 7/2003 | Akikusa | H01M 8/0245 429/423 |
| 2007/0111060 A1 | 5/2007 | Hoffjann et al. | |
| 2008/0001026 A1* | 1/2008 | Hoffjann | B64D 11/02 244/58 |
| 2008/0210812 A1 | 9/2008 | Gans et al. | |
| 2009/0123810 A1 | 5/2009 | Devoe et al. | |
| 2010/0193629 A1 | 8/2010 | Breit et al. | |
| 2011/0027678 A1 | 2/2011 | Nuessle | |
| 2011/0045369 A1* | 2/2011 | Nuessle | H01M 8/0444 429/428 |

FOREIGN PATENT DOCUMENTS

| | | | | |
|---|---|---|---|---|
| DE | 102008016578 A1 | 10/2009 | | |
| DE | 102008016579 A1 | 10/2009 | | |
| DE | 102004058430 B4 | 7/2010 | | |
| JP | 61 101968 | 5/1986 | | |
| JP | 2001-338660 | * 12/2001 | | H01M 8/04 |
| JP | 2001 338660 A | 12/2001 | | |
| JP | 2004 311242 A | 11/2004 | | |
| JP | 2008 078067 A | 4/2008 | | |
| WO | 2007/045103 A2 | 4/2007 | | |
| WO | WO2007/045103 | * 4/2007 | | H01M 8/04 |
| WO | WO2009/121560 | * 8/2009 | | H01M 8/24 |

* cited by examiner

FUEL CELL SYSTEM, USE OF A FUEL CELL SYSTEM AND AIRCRAFT WITH A FUEL CELL SYSTEM

CROSS-REFERENCE TO RELATED APPLICATIONS

The present application is a continuation of International Application No. PCT/EP2011/069953, filed Nov. 11, 2011, which claims priority from German Patent Application No. 10 2010 054 756.5 filed on Dec. 16, 2010, and which claims the benefit of the filing date of U.S. Provisional Patent Application No. 61/423,703 filed on Dec. 16, 2010, the disclosures of which are hereby incorporated herein by reference.

TECHNICAL FIELD

The invention relates to a fuel cell system, to the use of a fuel cell system, as well as to an aircraft comprising a fuel supply unit and such a fuel cell system.

BACKGROUND OF THE INVENTION

Fuel cell systems frequently comprise a housing that encloses one or several fuel cells and that comprises a connection for fuel cell fuel for supplying the fuel cell. By means of an exhaust gas line, exhaust gases are led to the outside by way of one or several separate exhaust gas connections. In addition, frequently, ventilation takes place in the housing in order to prevent any accumulation of hydrogen and thus the danger of an explosion occurring within the housing, and consequently the housing typically also comprises connections for ventilation supply air and ventilation exhaust air for affixing supply air lines and exhaust air lines.

The supply line for fuel cell fuel, which is, for example, designed as gaseous hydrogen, needs to be adequately sealed and monitored so that in particular in the case of the use of the fuel cell system in an aircraft no hydrogen accumulation occurs in regions through which the supply line extends. Furthermore, in this context regular monitoring needs to be provided, which could ensure constant high quality.

DE 10 2004 058 430 B4 shows a fuel cell system in an aircraft with lines for hydrogen, oxygen or air and exhaust gas.

BRIEF SUMMARY OF THE INVENTION

Providing a single supply line for fuel cell fuel and its constant monitoring for correct functioning can present a challenge, in particular in complex higher-level systems, for example in vehicles, and in particular in aircraft. This is further reinforced by the installation length of the line from a fuel tank to the fuel cell system, which installation length, due to a frequently not directly adjacent arrangement can extend over a certain length. Furthermore, monitoring a fuel line over its entire length is very involved and requires at least several sensors that are designed to be able to detect an unusual hydrogen concentration.

An aspect of the invention proposes a fuel cell system that comprises a housing which encloses at least one fuel cell, and which fuel cell comprises a supply line for fuel cell fuel, which supply line allows particularly easy detectability of, or tolerance to, leakages while at the same time nevertheless providing significantly higher system safety than is common in the state of the art.

According to a first aspect of the invention, the fuel cell system comprises a housing that encases a fuel cell; a supply line for a fuel cell fuel; and an exhaust gas line for fuel-cell exhaust gas. The supply line extends in the exhaust gas line, and the exhaust gas line encases the supply line while forming a space.

Combining a supply line for fuel cell fuel and an exhaust gas line in one component can ensure that fuel cell fuel emanating from the supply line cannot immediately flow into the surroundings but instead impinges the surrounding exhaust gas line. At the same time, as a result of the outflowing exhaust gas any fuel emanating is immediately flushed from the space between the supply line and the exhaust gas line and in an ideal case reaches the surroundings of the higher-level system, for example of a non-pressurized region of an aircraft, which region exchanges air with the surroundings of the aircraft, and consequently there is no longer any danger.

The design is integrated, simple, and provides very high system safety. It is possible not only to save weight but also to significantly improve safety, while at the same time reducing costs relating to the monitoring of leakages along the entire length of the supply line.

According to an advantageous embodiment, the exhaust gas line is connected to a cathode of the fuel cell. In that location the unused air content is removed, which for example in the case of supplied ambient air accounts for by far the greatest share of the supplied air. This ensures safe flow around the supply line for the fuel cell fuel.

At the same time with a corresponding selection of the supplied combustion air quite a low oxygen content in the exhaust air can be ensured so that at the same time no combustible air-hydrogen mixture arises in the space between the exhaust gas line and the supply line.

In an advantageous embodiment of the invention, furthermore, a suction line with a first end and a second end is provided, wherein the first end is arranged in the exhaust gas line and comprises a first opening which faces in the direction of an exhaust gas flow, and wherein the second end is arranged inside the housing and outside the exhaust gas line. In this manner a fluid connection between the free housing design space and the exhaust gas line arises, by means of which fluid connection in the case of outflowing exhaust gas a suction effect comes into existence in the exhaust gas line, which suction effect draws air from the free design space of the housing into the exhaust gas line. In this manner, if a steady inflow of air or some other gas is correspondingly ensured, it can be ensured that there is always a flow around the design space within the housing so that cooling takes place. The supply air originates from the surroundings of the higher-level system, for example the aircraft cabin.

According to an advantageous embodiment the first end comprises a venturi nozzle that is designed, by means of outflowing exhaust gas that moves past, to suck air from the housing. In this arrangement the venturi nozzle can be of such a shape that ventilation of the housing is ensured without the need for additional measures such as fans, pumps or the like.

According to an advantageous embodiment the fuel cell system comprises a purge valve (also known as "purge valve") that is connected both to an anode of the fuel cell and to the exhaust gas line. Such a purge valve makes it possible to flush inert gas contents of the hydrogen and arising water contents from the fuel cell or, for example in the case of a system shut-down, to reduce the pressure on the anode side of the fuel cell. In normal operation of the fuel cell the purge valve is usually closed to prevent the reaction gases present at the anode from escaping. However, in particular in the case of PEM fuel cells it is recommended that the purge valve regularly be opened for a short period of time in order to purge, by means of hydrogen, any condensation water that may have arisen, which condensation water in the case of excessive accumulation would reduce the gas exchange on the anode side. As a result of the overpressure on the anode side, in the fuel cell system according to the invention the condensed-out water is thus delivered to the exhaust gas line.

Preferably, the purge valve is furthermore connected to a control device and/or to a regulating device that is designed to open the purge valve for a predetermined period of time.

An advantageous embodiment comprises a hydrogen sensor that is arranged on an inside of the housing. In this manner it is possible to determine whether there is a dangerous hydrogen concentration within the housing, so that countermeasures can be taken. This can be achieved by activating or intensifying a purge volume flow. If a suction line is used which during regular operation of the fuel cell causes steady flushing of the housing, while at the same time an increased hydrogen concentration within the housing is detected, by additional active conveying of air into the housing by means of a fan, improved flushing can be achieved.

In an advantageous embodiment of the invention, in addition there is a hydrogen sensor on the exhaust gas line in order to detect any leakage in the supply line for fuel cell fuel. The hydrogen sensor is preferably arranged on an end of the exhaust gas line, which end faces away from the fuel cell because in that location, as a result of flushing the space between the exhaust gas line and the supply line, all the hydrogen emanating from the supply line is conveyed to the end of the exhaust gas line.

In a preferred embodiment the fuel cell is a low-temperature fuel cell of the PEMFC type or a fuel cell of the high-temperature PEMFC type. Such fuel cells are mature and suitable for regular operation, in particular on board vehicles. Preferably, the fuel cell can operate as a low-temperature fuel cell in a temperature range of approx. 60 to 80° C. As an alternative to this, the fuel cell can also operate as a high-temperature fuel cell in a temperature range of approx. 120° C. to approx. 300° C.

In an advantageous embodiment of the invention, air from the surroundings is used as an oxygen source and is conveyed to the cathode of the fuel cell. By using the oxygen content in the ambient air, strongly oxygen-depleted air arises which, after possible condensing-out of the arising process water, is then transported to the exhaust gas line so that a combustible hydrogen-air mixture can be prevented from arising. In an exception from the above, a certain component of the exhaust gas can be used to render inert a fuel tank of a vehicle, a cargo compartment of a vehicle, or other zones of a higher-level system, for example an avionics compartment of an aircraft. To this effect, prior condensing-out of the water and subsequent drying are required.

In a further advantageous embodiment of the invention, in addition a fan is arranged in the housing in order to reinforce flushing of the housing. With the use of the fuel cell system according to the invention in an aircraft, in particular during time on the ground such a fan is advantageous because as a result of the absence of a pressure differential between the interior of the housing and the surroundings of the aircraft there is no suction effect on the exhaust gas line and consequently passive flushing by way of a nozzle may not be adequately effective.

Finally, another aspect of the invention includes an aircraft with a provision unit for fuel cell fuel and with a fuel cell system according to the characteristics mentioned above.

BRIEF DESCRIPTION OF THE DRAWINGS

Further characteristics, advantages and application options of the present invention are disclosed in the following description of the exemplary embodiments and of the figures. All the described and/or illustrated characteristics per se and in any combination form the subject of the invention, even irrespective of their composition in the individual claims or their interrelationships. Furthermore, identical or similar objects in the figures have the same reference characters.

DETAILED DESCRIPTION

Figure 1:
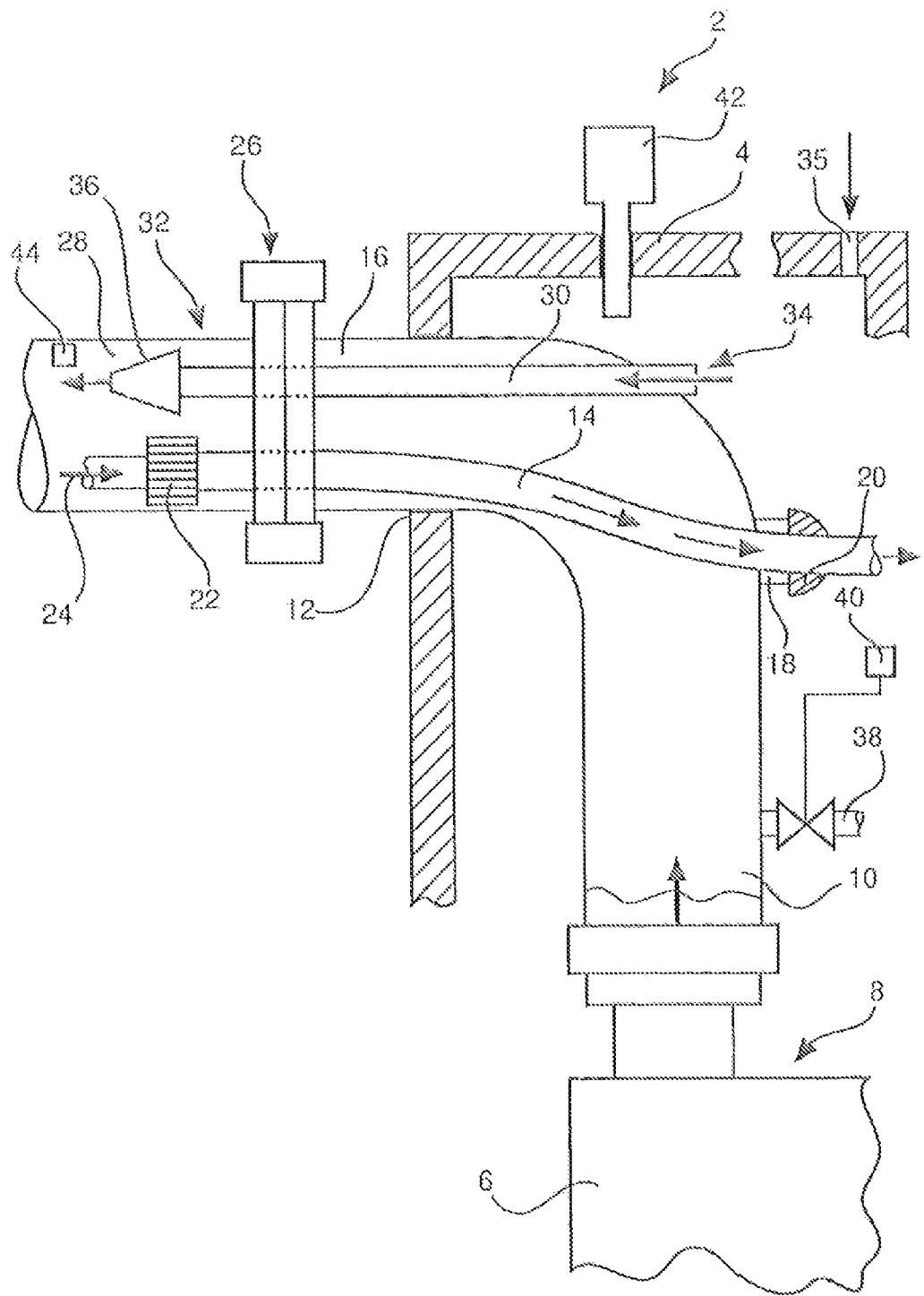
FIG. 1 shows a diagrammatic view of a first variant of a fuel cell system according to the invention.

FIG. 1 shows a fuel cell system 2 comprising a housing 4 in which a fuel cell 6 is arranged. On a cathode side 8 an exhaust gas line 10 is connected that extends from the cathode side 8 through an opening 12 within the housing towards the outside.

A supply line 14 which extends from the outside into the interior of the housing 4 extends over a significant section within the exhaust gas line 10. The exhaust gas line 10 comprises a significantly larger diameter than the supply line 14. Between the supply line 14 and the exhaust gas line 10 a space 16 is thus formed that originates from exhaust gas from the cathode side 8 of the fuel cell 6.

The exhaust gas line 10 comprises an opening 18 through which the supply line 14 reaches the interior of the housing 4, for example by way of an elastic sleeve 20 to be sealed, which sleeve 20 clamps the supply line. At that point said supply line 14 can supply fuel cell fuel to the fuel cell 6 (not shown).

In the interior of the housing 4 the supply line 14 can be designed as an elastic hose line or the like which, by way of a single-piece or two-piece plug-type or screw-type coupling 22 made of a plastic or a metallic material, which coupling 22 that is connected to the supply line 14 in a positive-locking, integral, or non-positive-locking manner, can be connected to a stiffer pipe 24, which is, for example, directly connected to a hydrogen tank or to an output of a reformer, wherein the latter from a hydrogen-based fuel produces a gaseous fuel cell fuel on a hydrogen base. A hydrogen tank could ether comprise liquid or gaseous hydrogen, wherein the liquid hydrogen is vaporized by heat input from any desired suitable heat source before it is supplied to the fuel cell. The supply line 14 has preferably been made from an elastomer and, depending on the pressure and temperature occurring, comprises corresponding additives and/or reinforcement fibers. In order to handle higher pressures and greater temperature fluctuations, the pipe can, in particular, be made from a metallic material.

The exhaust gas line 10 can, furthermore, be connected to an exhaust gas pipeline 28 by way of a coupling 26, which exhaust gas pipeline 28 extends from a point outside the housing 4 further towards the outside. The coupling 26 can be made from a plastic or metallic material and should comprise adequate pressure resistance and tightness, and should be able to take up vibrations and positional displacements/tolerances which, for example, occur in the use of the shown fuel cell system 2 in an aircraft. It may make sense to design the coupling 26 as a plug-type or screw-type quick-connect coupling which under pressure and in a non-loaded state comprises interlocking or clamping elements to provide adequate connection security.

In the illustration shown there is, furthermore, a suction line 30 with a first end 32 and a second end 34 in the fuel cell system 2, wherein the first end 32 is arranged in the exhaust gas line 10 or in the exhaust gas pipeline 28, and the second end 34 is arranged inside the housing 4 and outside the exhaust gas line 10. Furthermore, as an example, on the first end 32 a venturi nozzle 36 is optionally arranged which at least in some sections is conical or in the shape of a truncated cone, which venturi nozzle 36 when exhaust gas flows from the exhaust gas pipe 10 induces negative pressure at the first end 32 of the suction line 30 so that air from the housing 4 is sucked into the exhaust gas line 10 or exhaust gas pipeline 28 by way of the second end 34. In this manner purely passive flushing of the housing 4 can be achieved as long as it remains ensured that an adequate quantity of air can flow into the housing 4. This can be achieved by a housing opening 35 to which optionally a supply air line can be connected that is in fluid communication with the environment or with an air conditioning system.

Furthermore, on the exhaust gas line 10 a purge valve 38, designed as a switching valve, is arranged which is designed to flush from the fuel cell the inert gas components of the hydrogen and any water arising, or to release overpressure on an anode side (not shown in the diagram) of the fuel cell 6. To this effect the purge valve 38 connects the anode side in a switchable manner to the exhaust gas line 10 and can be controlled by way of a regulating or control unit 40.

To monitor any hydrogen concentration within the housing 4 it may make sense to use at least one hydrogen sensor 42 that is arranged on the housing 4 and that measures the hydrogen concentration in the free design volume of the housing. If an excessive hydrogen concentration were to be detected it would be necessary to flush the housing 4 or to intensify flushing of the housing or, as soon as flushing the housing 4 is no longer adequate to displace the hydrogen, to switch the fuel cell system 2 off.

In addition to this, by way of a further hydrogen sensor 44 it is possible to detect whether the hydrogen line 14 or 24 is leaking and thus hydrogen is entering the exhaust gas line 10 or the exhaust gas pipeline 28. Since as a result of the constantly outflowing exhaust gas during operation of the fuel cell 6 hydrogen is always transported in the direction of the pipe 24 or to an outlet of the exhaust gas pipeline 28 (not shown), it makes sense to affix the additional hydrogen sensor 44 rather in the direction of flow of the exhaust gas away from the fuel cell system 2.

As soon as one of the hydrogen sensors 42 and 44 detects a hydrogen concentration in the housing or in the exhaust gas line 10 that no longer corresponds to a normal minimum value, by way of additional, active, ventilation a situation can safely be prevented in which a combustible mixture arises within the space between the exhaust gas line 10 and the supply line 14 or within the housing 4.

Figure 2:
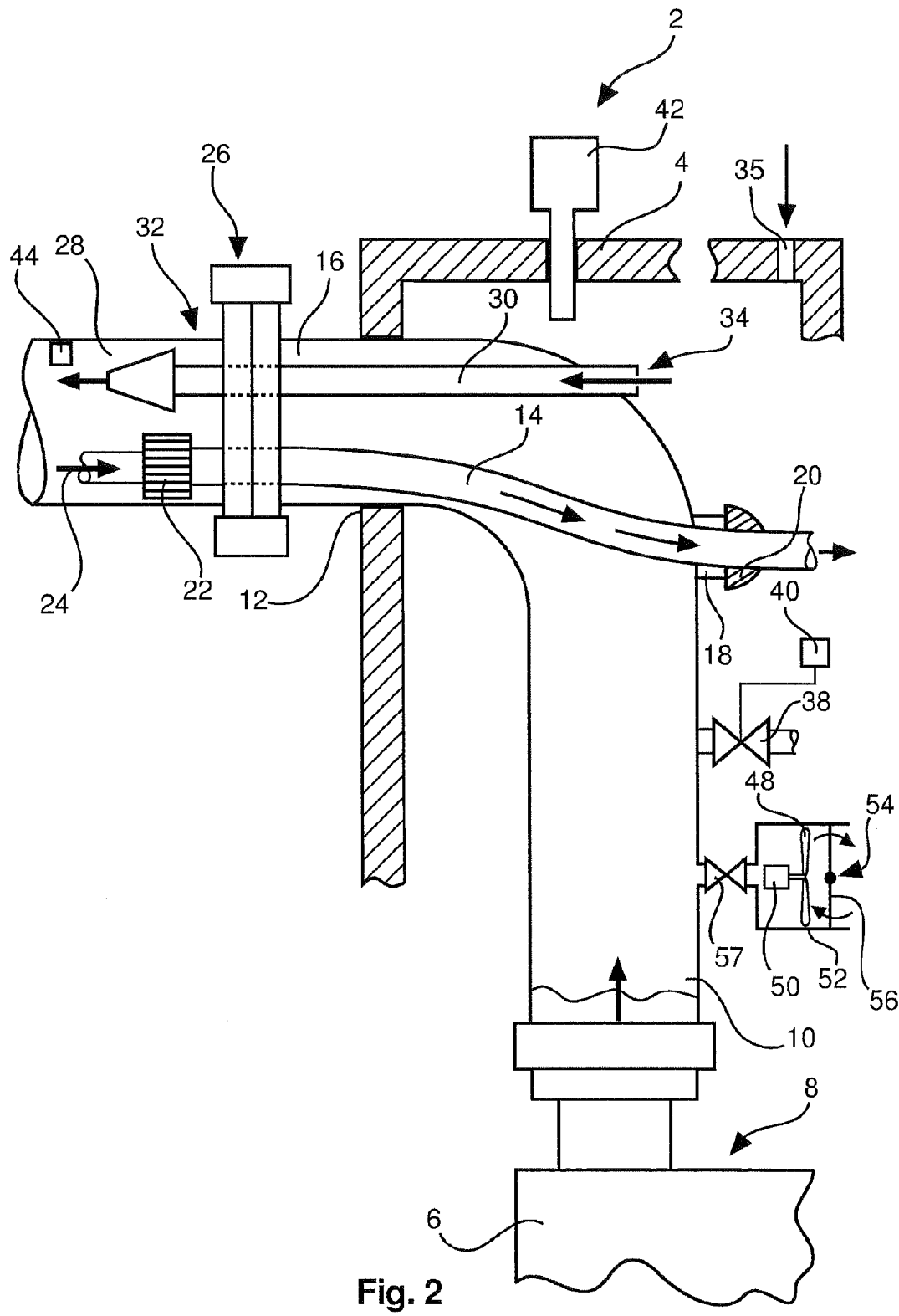
FIG. 2 shows a diagrammatic view of a second variant of a fuel cell system according to the invention.

FIG. 2 shows a fuel cell system 46 according to the invention that essentially corresponds to the fuel cell system 2 according to the invention of FIG. 1, except that it comprises an additional fan 48 in the housing 4. Said fan 48 could be driven by way of a motor 50 and could comprise a fan housing 52 that on one end comprises an air inlet 54 that optionally comprises a flow regulator device 56 and whose other end is optionally connected to the exhaust gas line 16 by way of a valve 57.

Figure 3:
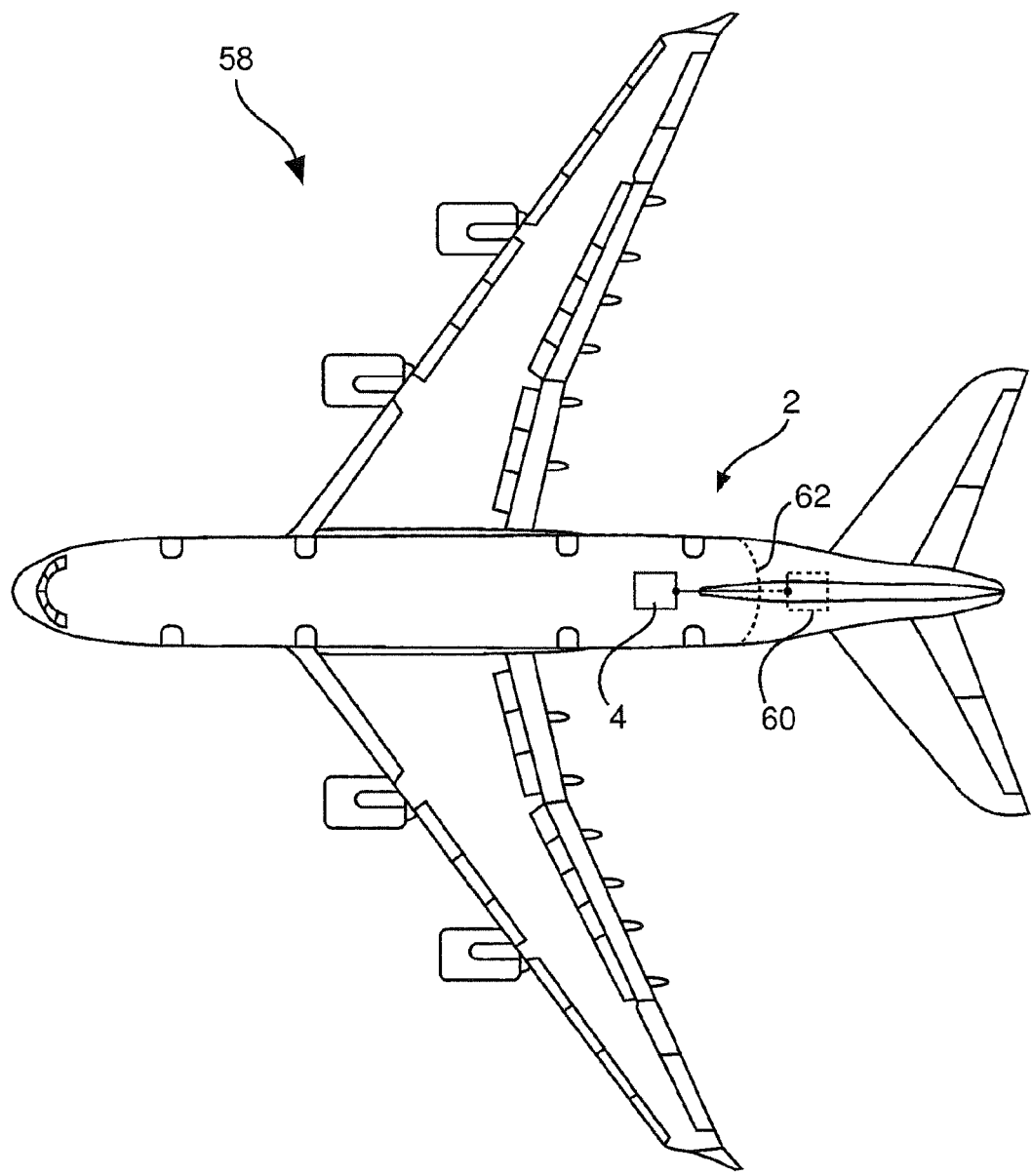
FIG. 3 shows an aircraft comprising a fuel cell system according to the invention.

FIG. 3 shows an aircraft 58 in which a fuel cell system 2 is arranged and is connected to a fuel supply unit 60 that can, for example, be designed as a fuel container for hydrogen in cryogenic form, or as a reformer unit for deriving hydrogen from kerosene. Preferably, the fuel cell 4 is arranged in a pressurized region of the aircraft 58, which in longitudinal direction is arranged in front of a pressure bulkhead 62. The fuel supply unit 60 is preferably arranged behind the pressure bulkhead in a non-pressurized region of the aircraft. By routing an exhaust gas line 10 from the pressurized region to the non-pressurized region, apart from the pressure as a result of the outflowing reaction gases, in addition negative pressure acts on the exhaust gas line 10, which negative pressure significantly improves conveying exhaust gas through the exhaust gas line, thus significantly improving the flushing effect.

In addition, it should be pointed out that "comprising" does not exclude other elements or steps, and "a" or "one" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

REFERENCE CHARACTERS

2 Fuel cell system
4 Housing
6 Fuel cell
8 Cathode side
10 Exhaust gas line
12 Opening
14 Supply line
16 Space
18 Opening
20 Sleeve
22 Coupling
24 Pipe
26 Coupling
28 Exhaust gas pipeline
30 Suction line
32 First end
34 Second end
35 Housing opening
36 Venturi nozzle
38 Purge valve
40 Regulating or control unit
42 Hydrogen sensor
44 Hydrogen sensor
46 Fuel cell system
48 Fan
50 Motor
52 Fan housing
54 Air inlet
56 Flow regulator device
57 Valve 58 Aircraft
60 Fuel supply unit
62 Pressure bulkhead

The invention claimed is:

1. A fuel cell system comprising:
a fuel cell having a housing encasing the fuel cell;
a supply line for a fuel cell fuel;
an exhaust gas line for fuel-cell exhaust gas having an opening in a section extending within the housing; and
a suction line having a first end and a second end and entering the exhaust gas line through the opening,
wherein the supply line extends in the exhaust gas line, and the exhaust gas line encases the supply line while forming a space, and the supply line is impervious to entry of any fluid from the space into the supply line,
wherein the first end is arranged in the exhaust gas line and comprises an opening facing in the direction of an exhaust gas flow, and
wherein the second end is arranged in the housing outside the exhaust gas line.

2. The fuel cell system of claim 1, wherein the exhaust gas line is connected to a cathode of the fuel cell.

3. The fuel cell system of claim 1, further comprising a venturi nozzle arranged on the first end, and configured, by outflowing exhaust gas moving past, to suck air from the housing.

4. The fuel cell system of claim 1, further comprising a purge valve connected to an anode of the fuel cell and to the exhaust gas line.

5. The fuel cell system of claim 1, further comprising a hydrogen sensor arranged on an inside of the housing.

6. The fuel cell system of claim 1, wherein the fuel cell is a low-temperature fuel cell of the PEMFC type or a fuel cell of the high-temperature PEMFC type.

7. The fuel cell system of claim 1, further comprising a supply air line configured to convey air from the surroundings to the fuel cell.

8. An aircraft comprising:
a fuel cell system comprising:
a fuel cell having a housing encasing the fuel cell;
a supply line for a fuel cell fuel;
an exhaust gas line for fuel-cell exhaust gas having an opening in a section extending within the housing;
at least one fuel supply unit for providing fuel to the fuel cell; and
a suction line having a first end and a second end and entering the exhaust gas line through the opening,
wherein the supply line extends in the exhaust gas line, and the exhaust gas line encases the supply line while forming a space, and the supply line is impervious to entry of any fluid from the space into the supply line,
wherein the first end is arranged in the exhaust gas line and comprises an opening facing in the direction of an exhaust gas flow, and
wherein the second end is arranged in the housing outside the exhaust gas line.

9. The aircraft of claim 8, wherein the fuel cell system is arranged within a pressurized region of the aircraft, and the fuel supply unit is arranged in a non-pressurized region of the aircraft.

10. A fuel cell system comprising:
a fuel cell having a housing encasing the fuel cell;
a supply line for a fuel cell fuel; and
an exhaust gas line for fuel-cell exhaust gas;
a suction line extending with a first end and a second end,
wherein the housing comprises a first opening, the exhaust gas line and the suction line passing through the first opening,
wherein the supply line extends in the exhaust gas line, and the exhaust gas line encases the supply line while forming a space therebetween,
wherein the supply line extends into the housing along with the exhaust gas line through the first opening,
wherein the exhaust gas line comprises a second opening in a portion extending within the housing, through which second opening the supply line extends out of the exhaust gas line,
wherein the first end is arranged in the exhaust gas line and comprises an opening facing in the direction of an exhaust gas flow, and
wherein the second end is arranged in the housing outside the exhaust gas line.

* * * * *